United States Patent
Kurita et al.

(10) Patent No.: US 7,164,623 B2
(45) Date of Patent: Jan. 16, 2007

(54) MAGNETO-OPTICAL RECORDING MEDIUM

(75) Inventors: Ryo Kurita, Kawasaki (JP); Ken Tamanoi, Kawasaki (JP); Shoyu Ito, Kawasaki (JP); Motonobu Mihara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 149 days.

(21) Appl. No.: 10/925,580

(22) Filed: Aug. 25, 2004

(65) Prior Publication Data
US 2005/0024993 A1 Feb. 3, 2005

Related U.S. Application Data

(63) Continuation of application No. PCT/JP02/01676, filed on Feb. 25, 2002.

(51) Int. Cl.
*G11B 11/00* (2006.01)

(52) U.S. Cl. .............. 369/13.41; 369/13.44; 369/283; 369/288; 428/694 SC

(58) Field of Classification Search ........... 369/13.41, 369/13.44, 13.35, 13.06, 13.32, 13.05, 13.43, 369/13.02, 275.1, 275.3, 275.4, 275.5, 283, 369/288, 286; 428/694 EC, 694 ML, 694 SC
See application file for complete search history.

(56) References Cited

U.S. PATENT DOCUMENTS 6,147,939 A * 11/2000 Takahashi et al. ....... 369/13.43
6,690,624 B1 * 2/2004 Shimazaki et al. ...... 369/13.06
6,693,854 B1 * 2/2004 Shimazaki et al. ...... 369/13.05
6,808,823 B1 * 10/2004 Hosokawa et al. ...... 428/819.3

FOREIGN PATENT DOCUMENTS

| | | |
|---|---|---|
| JP | 8-063810 | 3/1996 |
| JP | 8-273222 | 10/1996 |
| JP | 8-315436 | 11/1996 |
| JP | 9-147436 | 6/1997 |
| JP | 10-124943 | 5/1998 |
| JP | 11-003548 | 1/1999 |
| JP | 11-066651 | 3/1999 |
| JP | 11-176034 | 7/1999 |
| JP | 2000-057646 | 2/2000 |
| JP | 2000-067480 | 3/2000 |
| JP | 2000-200448 | 7/2000 |
| JP | 2001-229585 | 8/2001 |
| KR | 2002-0005593 | 1/2002 |
| WO | WO 01/46950 | 6/2001 |

* cited by examiner

*Primary Examiner*—Ali Neyzari
(74) *Attorney, Agent, or Firm*—Greer, Burns & Crain, Ltd.

(57) ABSTRACT

The present invention provides a magneto-optical recording medium including a recording layer, an intermediate layer and a reproducing layer stacked in this order. Information recorded in the recording layer is transferred to the reproducing layer through the intermediate layer so that the information is reproduced. The reproducing layer includes an upper reproducing layer, a coupling layer, and a lower reproducing layer formed in this order on the intermediate layer. Magnetic information in the upper reproducing layer in an area whose temperature is increased to a predetermined temperature is transferred to the lower reproducing layer through the coupling layer.

4 Claims, 16 Drawing Sheets

LIGHT

FIG.2

| | | MATERIAL (at%) | FILM THICKNESS | CURIE TEMP. (°C) |
|---|---|---|---|---|
| 18 | UPPER PROTECTIVE LAYER | SiN | 60 nm | ---- |
| 17 | RECORDING LAYER | Tb22Fe60Co18 | 50 nm | 260 |
| 16 | INTERMEDIATE LAYER | (Gd30Fe68Co2)Si | 40 nm | 200 |
| 15 | UPPER REPRODUCING LAYER (RE-rich) | Gd25Fe62Co13 | 30 nm | 280 |
| 14 | COUPLING LAYER | Mn50Fe50 | 5 nm | 200 |
| 13 | LOWER REPRODUCING LAYER(TM-rich) | Gd22Fe60Co18 | 10 nm | 280 |
| 12 | LOWER PROTECTIVE LAYER | SiN | 30 nm | ---- |
| 11 | SUBSTRATE | POLYCARBONATE | 0.60mm | ---- |

FIG.3

|  | CONVENTIONAL RAD MEDIUM | RAD MEDIUM OF EMBODIMENT 1 | RAD MEDIUM OF EMBODIMENT 2 |
|---|---|---|---|
| REFLECTANCE  R | 0.2 | 0.2 | 0.4 |
| KERR ROTATION ANGLE  $\theta k$ | 0.5 | 0.8 | 0.9 |
| $R * \theta k$ | 0.10 | 0.16 | 0.36 |
| $\sqrt{R} * \theta k$ | 0.22 | 0.36 | 0.54 |
| CNR  (dB) | 41 | 44 | 48 |

LIGHT

FIG.13

| UPPER PROTECTIVE LAYER | SiN |
| --- | --- |
| RECORDING LAYER | Tb22Fe60Co18 |
| ANTIFERROMAGNETIC LAYER | SiN |
| REPRODUCING ASSISTING LAYER | Gd14Fe86 |
| UPPER REPRODUCING LAYER | Gd31Fe54Co15 |
| COUPLING LAYER | MnFe |
| LOWER REPRODUCING LAYER | GdFeCo |
| LOWER PROTECTIVE LAYER | SiN |
| SUBSTRATE | |

FIG.14

| UPPER PROTECTIVE LAYER | SiN |
| --- | --- |
| RECORDING LAYER | Tb23Fe65Co12 |
| INTERMEDIATE LAYER | Dy22Fe78 |
| UPPER REPRODUCING LAYER | Gd22Fe78 |
| COUPLING LAYER | MnFe |
| LOWER REPRODUCING LAYER | GdFeCo |
| LOWER PROTECTIVE LAYER | SiN |
| SUBSTRATE | |

FIG.15

| UPPER PROTECTIVE LAYER | SiN |
|---|---|
| RECORDING LAYER | Tb25Fe62Co13 |
| INTERMEDIATE LAYER | Gd17Fe71Co12 |
| UPPER REPRODUCING LAYER | Gd29Fe71 |
| COUPLING LAYER | MnFe |
| LOWER REPRODUCING LAYER | GdFeCo |
| LOWER PROTECTIVE LAYER | SiN |
| SUBSTRATE | |

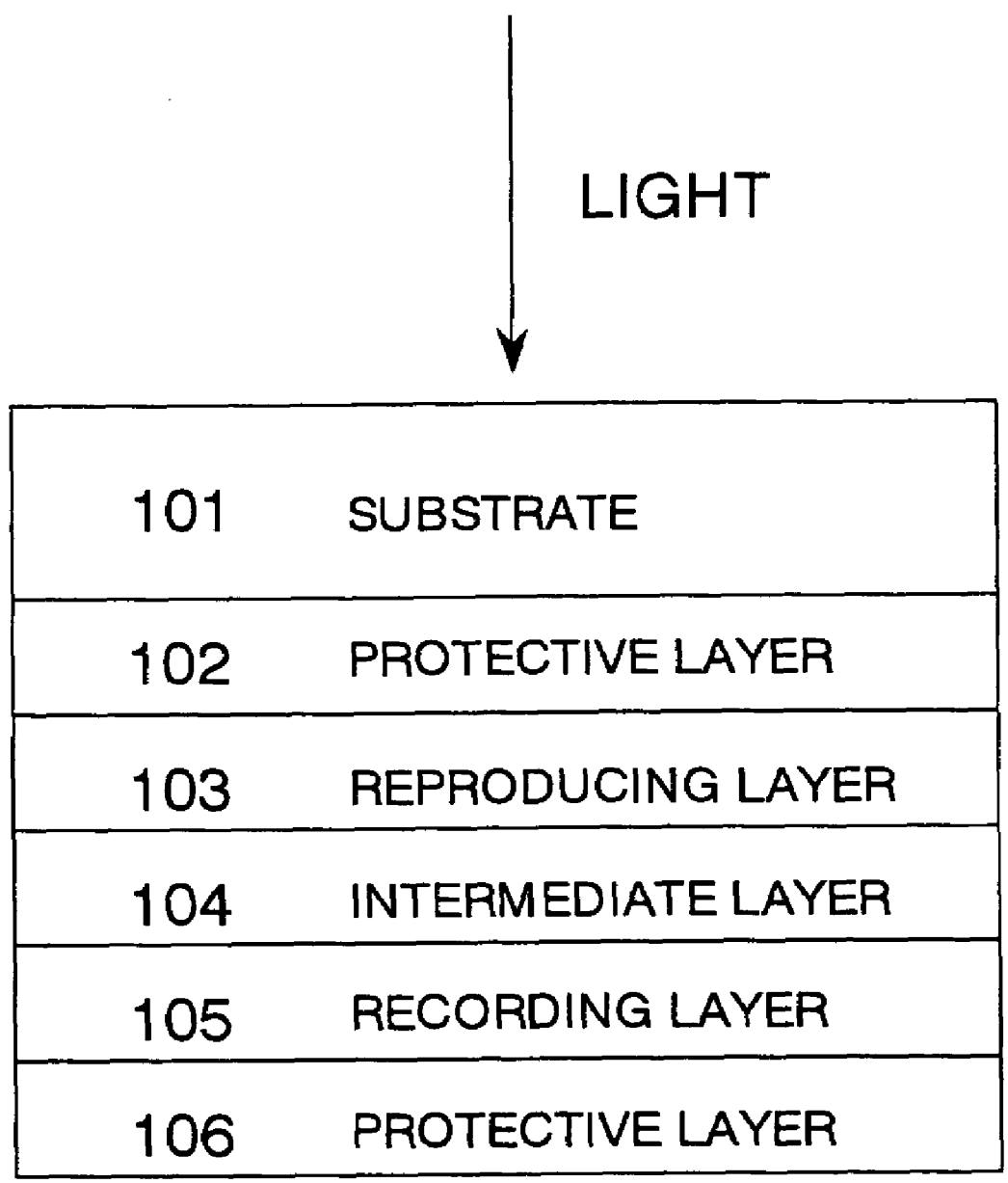

MAGNETO-OPTICAL RECORDING MEDIUM

This is a continuation of International PCT Application No. PCT/JP02/01676 filed Feb. 25, 2002.

TECHNICAL FIELD

The present invention relates to a magneto-optical recording medium, and more particularly, to a magneto-optical recording medium capable of recording and reproducing information, by magnetically induced super resolution, at a portion to which a magnetic field and a light beam are applied.

BACKGROUND ART

As one of high-density recording media, there is known a magneto-optical recording medium (hereinafter referred to as a magneto-optical disc) which performs recording and reproduction of information by applying an external magnetic field simultaneously with irradiation of laser light.

In recent years, further increase in recording capacity of the magneto-optical disc has been desired. To increase the recording capacity of the disc, the size of recording bits and the bit pitch in circumferential direction of the disc needs to be further reduced.

In general, the size of recording bits is determined by the diameter of the emitted laser spot. However, there has been proposed magnetically induced super resolution (MSR) reproduction method which allows for the reproduction of bits having a pitch smaller than the diameter of the spot (Japanese Unexamined Patent Publication No. 2000-200448). A magneto-optical recording medium which can be reproduced by the MSR reproduction method has a recording section of a three-layer structure including a reproducing layer, an intermediate layer, and a recording layer.

The MSR reproduction method is also referred to as a double mask RAD (Rear Aperture Detection) reproduction method because it uses a low-temperature area and a high-temperature area in a laser spot as magnetic mask regions and transfers, within a mid-temperature, the bits recorded in the recording layer to the reproducing layer area to read out the bits.

The principle of the MSR reproduction method will be described below.

In FIG. 16, a sectional view illustrating the constitution of a conventional magneto-optical disc is shown. In a recording layer 105, bits of size smaller than the diameter of the laser spot are recorded therein.

First, just before reproducing laser light is emitted, an initializing magnet is used to apply an initializing magnetic field to the disc, so that the magnetizations of a reproducing layer 103 and an intermediate layer 104 are directed to the same direction as the initializing magnetic field.

When the low-temperature area of the disc is irradiated with the reproducing laser light at the reproduction of the bits, the magnetizations of the reproducing layer 103 cover the bits recorded in the recording layer 105 to form a so-called front mask.

In the high-temperature area of the disc within the light beam spot where its temperature exceeds the Curie temperature of the intermediate layer 104, the exchange coupling exerted between the recording layer 105 and the reproducing layer 103 is broken and the magnetizations of the reproducing layer 103 in the high-temperature area are directed to the direction of the reproducing magnetic field applied from the outside. Consequently, in the high-temperature area, the reproducing layer 103 serves as a mask (rear mask) to cover the bits.

In an area (mid-temperature area) between the high-temperature and low-temperature areas serving as the masks in the portion of the disc irradiated with the light beam, the bits recorded in the recording layer 105 are transferred to the reproducing layer 103 through the intermediate layer 104. The transferred bits are irradiated with the reproducing laser light and the reflected light of the reproducing laser light is received by a light detector. Then, a Kerr rotation angle is detected so that recording bits recorded in the recording layer are reproduced.

With such a conventional MSR reproduction method, the bits can be reproduced from the mid-temperature area of a size smaller than the spot diameter of the light beam, thereby allowing for high resolution.

In the conventional MSR reproduction method, laser light having a wavelength of about 600 to 700 nm is generally used. If a laser beam having a shorter wavelength can be used, the minimum spot diameter that can be diffracted is made smaller, whereby the size of the recording bit can be reduced. Accordingly, the recording capacity of the magneto-optical disc of MSR reproduction type can be increased.

However, a GdFeCo film adopted as the reproducing layer 103 of the conventional magneto-optical disc of MSR reproduction type gives, when irradiated with a light beam having a short wavelength in the range of 350 nm to 450 nm, only a small Kerr rotation angle. Therefore, a magneto-optical effect sufficient for the reproduction can not be achieved.

Further, with the use of the shortwave laser light, a problem arises that a photodetector sensitivity decreases, and thus a reproduction signal (carrier level) is weakened.

DISCLOSURE OF INVENTION

The present invention provides a magneto-optical recording medium in which the film construction of a reproducing layer of an MSR reproduction type recording medium is contrived so that the Kerr rotation angle is increased and the CNR (carrier to noise ratio) is improved when shortwave laser light is used, and thereby the storage capacity of the recording medium is increased.

The magneto-optical recording medium of the present invention comprises a recording layer, an intermediate layer and a reproducing layer stacked in this order, information recorded in the recording layer being transferred to the reproducing layer through the intermediate layer so that the information is reproduced, wherein the reproducing layer comprises an upper reproducing layer, a coupling layer, and a lower reproducing layer formed in this order on the intermediate layer, and magnetic information in the upper reproducing layer in an area whose temperature is increased to a predetermined temperature is transferred to the lower reproducing layer through the coupling layer.

With this construction, the CNR at the reproduction of the recorded information can be improved and the recording density can be increased.

The lower reproducing layer, the upper reproducing layer, and the coupling layer may comprise a transition metal magnetization dominant magnetic film, a rare-earth magnetization dominant magnetic film, and an antiferromagnetic material, respectively. The coupling layer may have a Néel temperature higher than the temperature of the upper reproducing layer which is increased to the predetermined temperature at the transfer of information.

The coupling layer may be formed of a material selected from the group consisting of MnFe, CuO, NiO, CoNiO, CrMn, and AuCr. The lower reproducing layer may be formed of a transition metal magnetization dominant GdFeCo film, or a multilayer film of a Pt film and a Co film stacked alternately.

Further, the present invention provides a recording/reproducing apparatus for recording and reproducing information on/from the magneto-optical recording medium, comprising: a light source for emitting laser light of a short wavelength in the range of 350 nm to 450 nm; a light collecting section for collecting the emitted light on a predetermined portion of the magneto-optical recording medium rotating at a predetermined speed; a magnetic field applying section for applying a reproducing magnetic field to the predetermined portion of the magneto-optical recording medium; and a light detector for detecting a Kerr rotation angle for light reflected off the magneto-optical recording medium.

BRIEF DESCRIPTION OF DRAWINGS

FIG. 2 is an explanatory view showing typical materials, film thicknesses and Curie temperatures of magnetic layers of the magneto-optical recording medium according to the first embodiment of the invention;

FIG. 3 is a comparative view of the magnetic characteristics of the media according to the embodiments of the invention and a conventional medium;

FIG. 13 is a sectional view illustrating the construction of a CAD (center aperture detection) magneto-optical recording medium of the invention;

FIG. 14 is a sectional view illustrating the construction of a DWDD (domain wall displacement detection) magneto-optical recording medium of the invention;

FIG. 15 is a sectional view illustrating the construction of a MAMMOS (magnetic amplifying magneto-optical system) magneto-optical recording medium of the invention; and FIG. 16 is a sectional view illustrating the construction of a conventional magneto-optical recording medium.

BEST MODE FOR CARRYING OUT THE INVENTION

The present invention will hereinafter be described in detail by way of embodiments thereof shown in the attached drawings. It should be understood that the invention be not limited to these embodiments.

A magneto-optical recording medium according to the present invention comprises a recording layer, an intermediate layer, and a reproducing layer stacked in this order. The recording layer has information recorded therein and the information is transferred to the reproducing layer through the intermediate layer so that the information is reproduced. The reproducing layer of the present invention comprises an upper reproducing layer, a coupling layer, and a lower reproducing layer formed in this order on the intermediate layer. Magnetic information in the upper reproducing layer in an area whose temperature is increased to a predetermined temperature is transferred to the lower reproducing layer through the coupling layer.

In the present invention, the coupling layer controls exchange coupling exerted between the lower reproducing layer and the upper reproducing layer, and may be formed of an antiferromagnetic material.

With the presence of the coupling layer, the magnetic information in the upper reproducing layer in the area whose temperature is raised to the predetermined temperature or higher is effectively transferred to the lower reproducing layer. In view of an improvement in CNR, the lower reproducing layer is preferably formed of a magnetic film in which transition metal magnetization is dominant over rare earth metal magnetization, and on the other hand, the upper reproducing layer is preferably formed of a magnetic film in which the rare earth metal magnetization is dominant over the transition metal magnetization.

[General Construction of Magneto-Optical Recording/Reproducing Apparatus]

Figure 7:
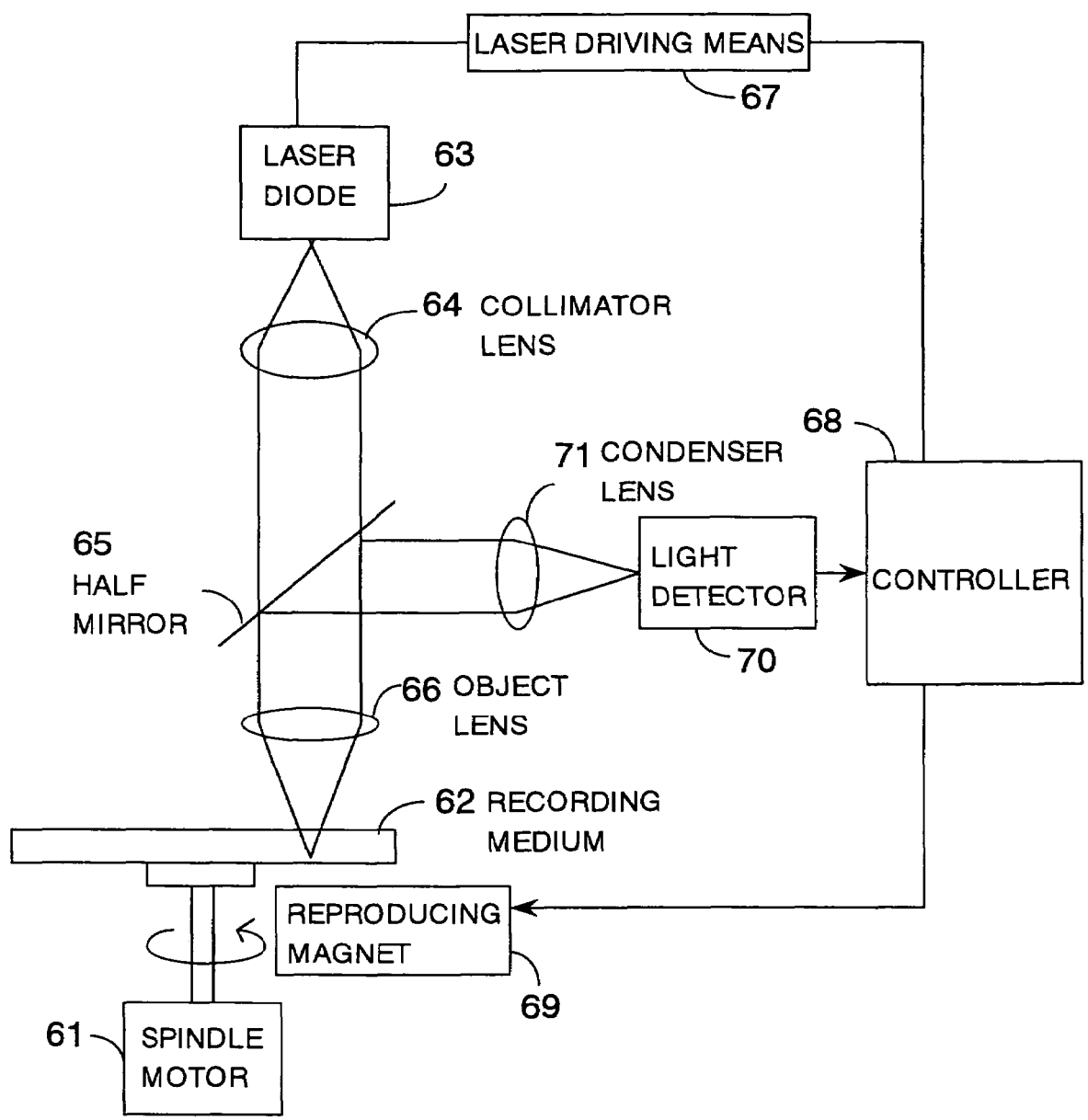
FIG. 7 is a block diagram illustrating the construction of a recording/reproducing apparatus for the magneto-optical recording medium according to the invention.

FIG. 7 shows a diagram illustrating the construction of a magneto-optical recording/reproducing apparatus 60 for recording and reproducing information on/from the magneto-optical recording medium of the invention. The recording/reproducing apparatus 60 has a spindle motor 61 for rotating a recording medium 62 of the invention at a predetermined speed. The medium is irradiated with laser light having a short wavelength in the range of 350 nm to 450 nm emitted from a laser diode 63. The laser light is converted to collimated light at a collimator lens 64, and passes through a half mirror 65. The collimated light is then collected by an object lens 66 and controlled so as to be focused on a recording film. The laser diode 63 is adjusted by a pulse modulation means provided in a laser driving means 67 so that high-level and low-level outputs are outputted. The pulse modulation means modifies the laser light to a pulse in accordance with the information to be recorded. Onto a laser spot and its vicinity on the recording medium, a DC magnetic field of a predetermined size is applied, for example, upwardly in the figure by a bias magnetic field applying means 69 (reproducing magnet), so that the information is recorded. The recording medium may be applied with a downward magnetic field and irradiated with light of a predetermined strength to perform erasure. These operations are conducted by a controller 68.

At the reproduction, the laser diode 63 is DC-driven by an instruction given from the controller 68 through the laser driving means 67 to emit laser light, and a reproducing magnet field in the same direction as in the recording is applied to the medium by the reproducing magnet 69.

When the recording medium 62 is irradiated with this laser light, the light reflected from the recording medium 62 is deflected by the half mirror 65 and collected by a condenser lens 71 to be incident upon a light detector 70. The controller 68 reproduces a signal from the light detector 70 so that the recorded information is reproduced with a fine CNR.

[Embodiment 1]

Figure 1:
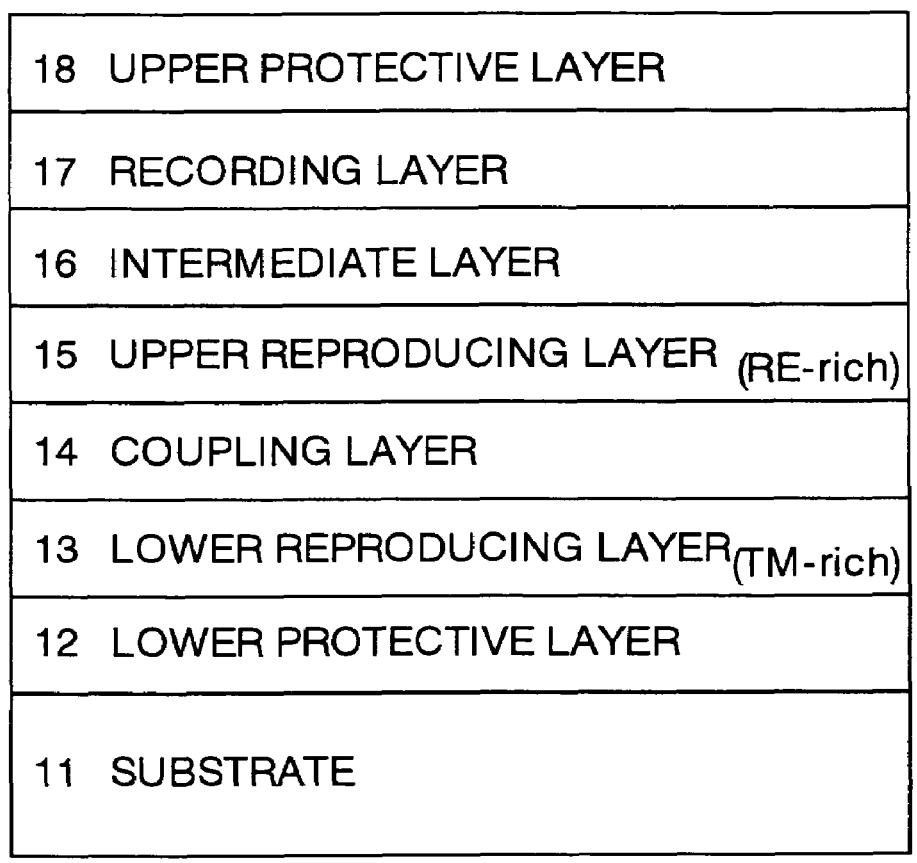
FIG. 1 is a sectional view illustrating the construction of a magneto-optical recording medium according to a first embodiment of the invention.
Figure 1:

FIG. 1 is a sectional view illustrating the construction of a magneto-optical disc according to a first embodiment of the invention. The magneto-optical disc according to the first embodiment has a lower protective layer 12, a lower reproducing layer 13, a coupling layer 14, an upper reproducing layer 15, an intermediate layer 16, a recording layer 17, and an upper protective layer 18 stacked in this order on a substrate 11.

The substrate 11 is made of a resin material such as glass and polycarbonate and has a thickness of about 0.60 nm. As the substrate 11, a so-called land/groove substrate is used which has guiding grooves for tracking and focusing formed on its surface and information recorded on its lands and grooves.

Exemplary thickness and material of each of the layers shown in FIG. 1 are described below.

Lower protective layer 12:
a thickness of 30 nm, SiN

Lower reproducing layer 13:
a thickness of 10 nm, Gd22Fe60Co18 (TM-rich)

Coupling layer 14:
a thickness of 5 nm, MnFe (antiferromagnetic)

Upper reproducing layer 15:
a thickness of 30 nm, Gd25Fe62Co13 (RE-rich)

Intermediate layer 16:
a thickness of 40 nm, (Gd30Fe68Co2) Si

Recording layer 17:
a thickness of 50 nm, Tb22Fe60Co18 (TM-rich)

Upper protective layer 18:
a thickness of 60 nm, SiN

The lower reproducing layer 13 is formed of a transition metal magnetization dominant (also referred to as TM-rich) material having perpendicular magnetization. The upper reproducing layer 15 is formed of a rare earth metal magnetization dominant (also referred to as RE-rich) material having perpendicular magnetization.

In this embodiment, the lower reproducing layer 13 and the upper reproducing layer 15 are formed of GdFeCo. When the GdFeCo contains not more than about 24% of Gd, the transition metal magnetization is dominant, and when the GdFeCo contains not less than about 24% of Gd, then the rare-earth magnetization is dominant.

In addition to the above, the lower reproducing layer 13 and the upper reproducing layer 15 may be formed of a material used for an RAD type medium. Particularly, an alloy of a rare earth metal and a transition metal is preferably used. Examples of the rare earth/transition metal alloy include GdFe, TbFeCo and DyFeCo.

The magneto-optical disc of the present invention has the reproducing layer composed of the three layers (13, 14, and 15), whereas a conventional magneto-optical disc of MSR reproduction type has a reproducing layer composed of the rare-earth magnetization dominant (RE-rich) GdFeCo only.

The coupling layer 14 is made of an antiferromagnetic material, and is formed between the upper and lower reproducing layers 15 and 13 to reinforce the coupling between the two layers (13 and 15).

The coupling layer 14 controls the strength of third exchange coupling exerted between the lower and upper reproducing layers 13 and 15. The function of the coupling layer 14 is to transfer bits in the upper reproducing layer 15 present in an area of a predetermined temperature (a mid-temperature area which will be discussed later) to the lower reproducing layer 13 in the corresponding area. Therefore, the coupling layer 14 is preferably formed of the antiferromagnetic material having a Néel temperature $T_n$ higher than the temperature (transfer temperature $T_o$) of the coupling layer 14 at the transfer of bits from the upper reproducing layer 15 to the lower reproducing layer 13. In addition to the above-mentioned MnFe, the coupling layer 14 may be formed of, for example, CrMn, (2% or more Mn), AuCr (35% or more Cr), or an oxide such as CuO, NiO, and CoNiO.

The intermediate layer 16 is a rare-earth magnetization dominant (RE-rich) magnetic film having in-plane magnetization and a compensation point which is not below the Curie temperature thereof. The recording layer 17 is a transition metal magnetization dominant (TM-rich) film having perpendicular magnetization.

In the first embodiment, as shown in FIG. 2, the intermediate layer 16, recording layer 17, upper reproducing layer 15, and lower reproducing layer 13 have a Curie temperature of 200° C., 260° C., 280° C., and 280° C., respectively, and the coupling layer 14 has a Néel temperature (Tn) of 200° C. The above-mentioned transfer temperature $T_o$ (<Tn) is about 100° C.

As mentioned above, the reproducing layer of the present invention is composed of the three layers (13, 14, and 15). This construction is designed so as to form masks as in the conventional magneto-optical disc and to improve a Kerr rotation angle.

In the conventional magneto-optical disc, the reproducing layer is formed of the rare-earth magnetization dominant magnetic film so that so-called front and rear masks are formed. On the other hand, it is known that the reproducing layer formed of the transition metal magnetization dominant magnetic film is preferably used to improve the Kerr rotation angle. However, the reproducing layer formed of the transition metal magnetization dominant magnetic film can not form effective masks.

In addition to the above, the reproducing layer formed of a combination of the rare-earth magnetization dominant magnetic film and the transition metal magnetization dominant magnetic film may also be considered. However, it is found that when the magnetic films of two magnetizations are formed so as to be in contact with each other directly, the formation of the effective masks is difficult and an improvement in Kerr rotation angle can not be achieved.

For the above reasons, the coupling layer 14 made of the antiferromagnetic material is formed between the rare-earth magnetization dominant magnetic film (upper reproducing layer 15) and the transition metal magnetization dominant magnetic film (lower reproducing layer 13) in the present invention, so that the effective front and rear masks can be formed and an improved Kerr rotation angle can be obtained.

[Production Method of Medium According to Embodiment 1]

Next, an example of production methods of the magneto-optical disc according to the first embodiment of the invention will be described.

Each layer (12–18) shown in FIG. 1 is formed by a DC magnetron sputtering method in which a substrate and a predetermined solid target are arranged in a vacuum container and a sputter gas is introduced for formation of a film. A maximum attainable vacuum level is $3 \times 10^{-5}$ Pa or less.

(1) First, an SiN film as the lower protective layer 12 is formed on a substrate 11. The formation of the SiN film 12 is performed using an Si target, Ar gas and $N_2$ gas under a gas pressure of 0.8 Pa and an electric power supply of 0.8 kW.

(2) Next, a GdFeCo film as the lower reproducing layer 13 is formed on the lower protective layer 12. The formation of the TM-rich lower reproducing layer 13 is performed using a GdFeCo alloy target and Ar gas under a gas pressure of 0.8 Pa and an electric power supply of 0.8 kW.

(3) Then, an MnFe film as the coupling layer 14 is formed on the lower reproducing layer 13. The formation of the coupling layer 14 is performed using Mn and Fe targets, and Ar gas under a gas pressure of 0.5 Pa and an electric power supply of 0.5 kW.

(4) Subsequently, a GdFeCo film as the upper reproducing layer 15 is formed on the coupling layer 14. The formation of the RE-rich upper reproducing layer 15 is performed using a GdFeCo alloy target and Ar gas under a gas pressure of 0.8 Pa and an electric power supply of 0.8 kW.

(5) In turn, a (GdFeCo) Si film as the intermediate layer 16 and a TbFeCo film as the recording layer 17 are formed in this order on the upper reproducing layer 15. The formation of these layers is performed using targets of the respective compositions and Ar gas under a gas pressure of 0.5 Pa and an electric power supply of 0.5 kW.

(6) Lastly, an SiN film as the upper protective layer 18 is formed on the recording layer 17. The formation of the SiN film 18 can be performed under the same conditions as the lower protective layer 12.

Consequently, the magneto-optical disc according to the first embodiment of the invention is completed. As shown in FIG. 1, the magneto-optical disc of the first embodiment is irradiated with reproducing laser light from the substrate 11 side so that the bits recorded in the recording layer 17 are reproduced.

[Explanation on Magnetic State of Medium at Reproduction According to Embodiment 1]

Figure 11:
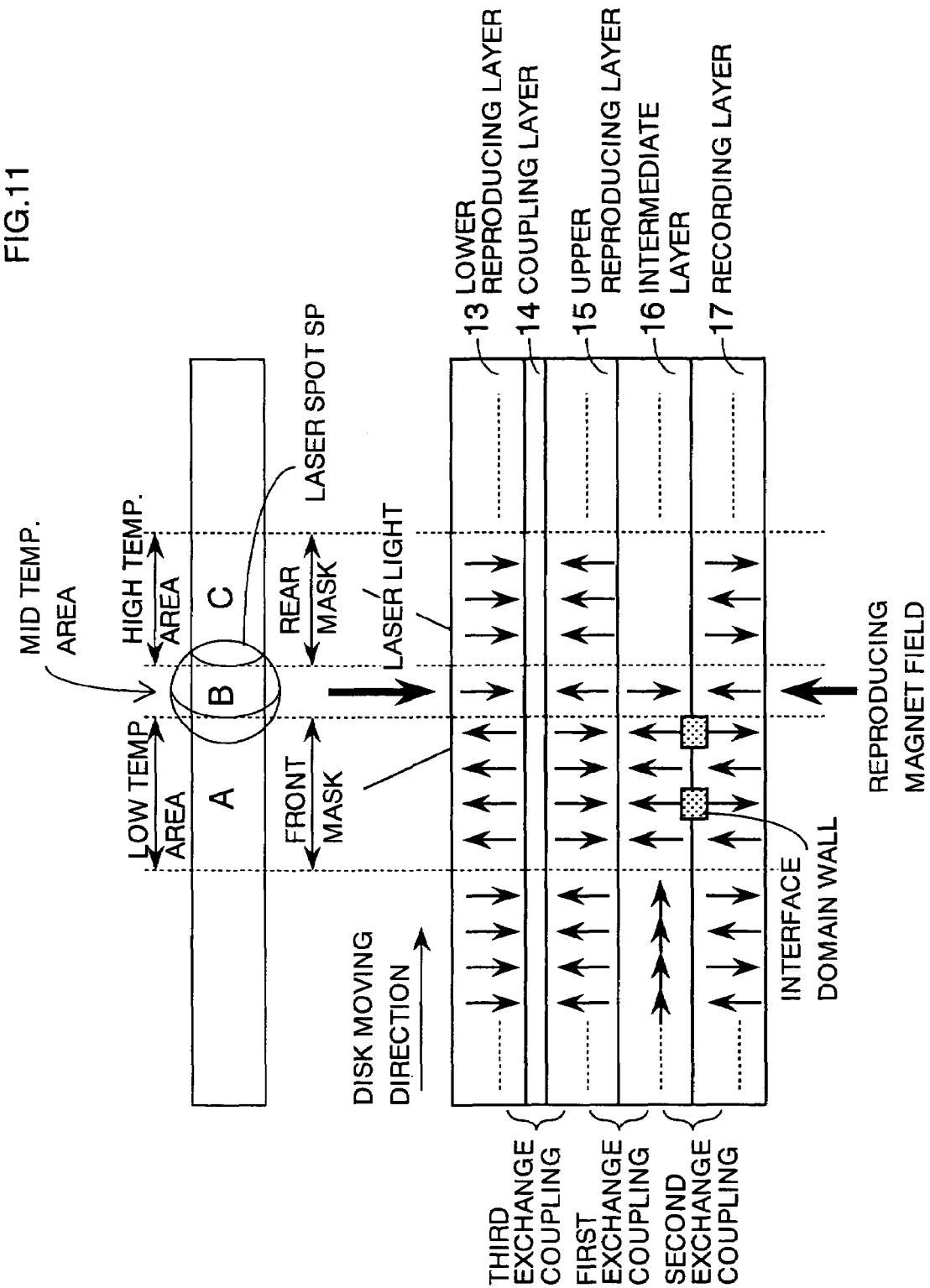
FIG. 11 is an explanatory view of the magnetic state of the medium at reproduction according to the first embodiment of the invention.

Next, an explanation will be given on the magnetic state of the medium at reproduction of recorded information according to the first embodiment of the invention. FIG. 11 is an explanatory view of the magnetic state of the medium at reproduction according to the first embodiment of the invention. In the figure, out of the layers which constitute the medium, a portion from the lower reproducing layer 13 to the recording layer 17 is shown. The substrate 11 is shown in the upper part of the figure, and laser light is emitted from above the substrate 11. The reproducing magnetic field is applied from the recording layer 17 side shown in the lower part of the figure. In FIG. 11, the medium shifts from the left side to the right side of the figure. The directions of arrows shown in each layer of the figure indicate the directions of magnetizations at their respective positions.

A laser spot SP has a round shape as shown in FIG. 11, and is divided into three areas of a low-temperature area A, a mid-temperature area B, and a high-temperature area C since the medium moves. Due to the difference among Curie temperatures of the respective magnetic layers in each area, the information recorded in the recording layer 17 is read through the mid-temperature area B only.

The respective magnetic layers have exchange coupling exerted on their surfaces. The directions of magnetizations change depending on the presence or absence of the exchange coupling, or the strength of the exchange coupling.

The low-temperature area A is a front area which is first irradiated with the laser light. In this area, magnetizations of the bits in the intermediate layer 16 are all directed to the direction of a reproducing magnet field. Magnetizations of the upper reproducing layer 15 in the low-temperature area are directed downward which is opposite to the direction of magnetizations of the intermediate layer 16. Further, in the lower reproducing layer 13 of the low-temperature area, its magnetizations are in direction (upward) opposite to the direction of magnetizations of the upper reproducing layer 15.

In other words, the directions of magnetizations of the intermediate layer 16, the upper reproducing layer 15, and the lower reproducing layer 13 in the low-temperature area A are controlled as shown in the figure, so that a mask is formed to prevent the bits recorded in the recording layer 17 from being read out. The mask thus formed is called a front mask.

In the low-temperature area A, the strength of first exchange coupling exerted between the intermediate layer 16 and the upper reproducing layer 15 and the strength of third exchange coupling exerted between the upper reproducing layer 15 and the lower reproducing layer 13 are greater than the strength of second exchange coupling exerted between the recording layer 17 and the intermediate layer 16. Consequently, when the reproducing magnet field passes through the low-temperature area, magnetizations of the recording layer 17 are not transferred to the intermediate layer 16, and the magnetizations of the lower reproducing layer 13 in the low-temperature area are directed to one way so that the information is not reproduced.

On the other hand, in the mid-temperature area B, the second exchange coupling, the first exchange coupling, and the third exchange coupling are effectively exerted between the recording layer 17 and the intermediate layer 16, between the intermediate layer 16 and the upper reproducing layer 15, and between the upper reproducing layer 15 and the lower reproducing layer 13, respectively. This allows magnetizations recorded in the recording layer 17 to be transferred to the lower reproducing layer 13 through the intermediate layer 16 and the upper reproducing layer 15. By reading a Kerr rotation angle detected from the reflected light of the laser light applied on the lower reproducing layer 13 in the mid-temperature area B, the information is reproduced.

Since the temperature of the intermediate layer 16 in the high-temperature area C is at its Curie temperature or higher, magnetizations of the intermediate layer 16 in the high-temperature area are lost. Consequently, the first exchange coupling and the second exchange coupling are not exerted, and thereby magnetizations of the upper reproducing layer 15 are directed to the same direction as the reproducing magnetic field (upward direction in the figure).

Further, in the high-temperature area C, the third exchange coupling is exerted between the upper reproducing layer 15 and the lower reproducing layer 13, and magnetizations of the lower reproducing layer 13 are directed to the direction opposite to the magnetizations of the upper reproducing layer 15 (downward direction). In other words, in the high-temperature area C, the information in the recording layer 17 is not transferred, and the magnetizations in the direction opposite to the reproducing magnet field are formed in the lower reproducing layer 13, so that a so-called rear mask is formed.

The third exchange coupling exerted between the upper reproducing layer 15 and the lower reproducing layer 13 is generated by the presence of the antiferromagnetic coupling layer 14 which is interposed therebetween.

To generate the third exchange coupling, the Néel temperature of the coupling layer 14 is set to 200° C. in the first embodiment so that the Néel temperature is higher than the temperature (100° C.) that allows the bits of the upper reproducing layer 15 to be transferred to the lower reproducing layer 13.

[Magnetic Characteristics of Medium According to Embodiment 1]

Next, an explanation will be given on the magnetic characteristics of the magneto-optical recording medium according to the first embodiment of the invention.

FIG. 3 is a comparative view of the magnetic characteristics of the media according to the first embodiment of the invention and a conventional medium. The magnetic characteristics of the two media are determined under the conditions of: a linear velocity of 7.5 m/s; a laser light wavelength=405 nm, a numerical aperture NA of lens=0.65, and a mark length of recording mark=0.2 μm.

According to FIG. 3, the medium of the first embodiment exhibits a Kerr rotation angle of 0.8° showing an improvement over the conventional medium by 0.3°. Further, the medium of the first embodiment exhibits, as an index of the magnetic characteristics, a performance index ($\sqrt{R} \times \theta$ K) of 0.36 which is also higher than the conventional medium. A carrier to noise ratio (CNR) is 44 dB showing an improvement over the conventional medium by 3 dB.

Figure 8:
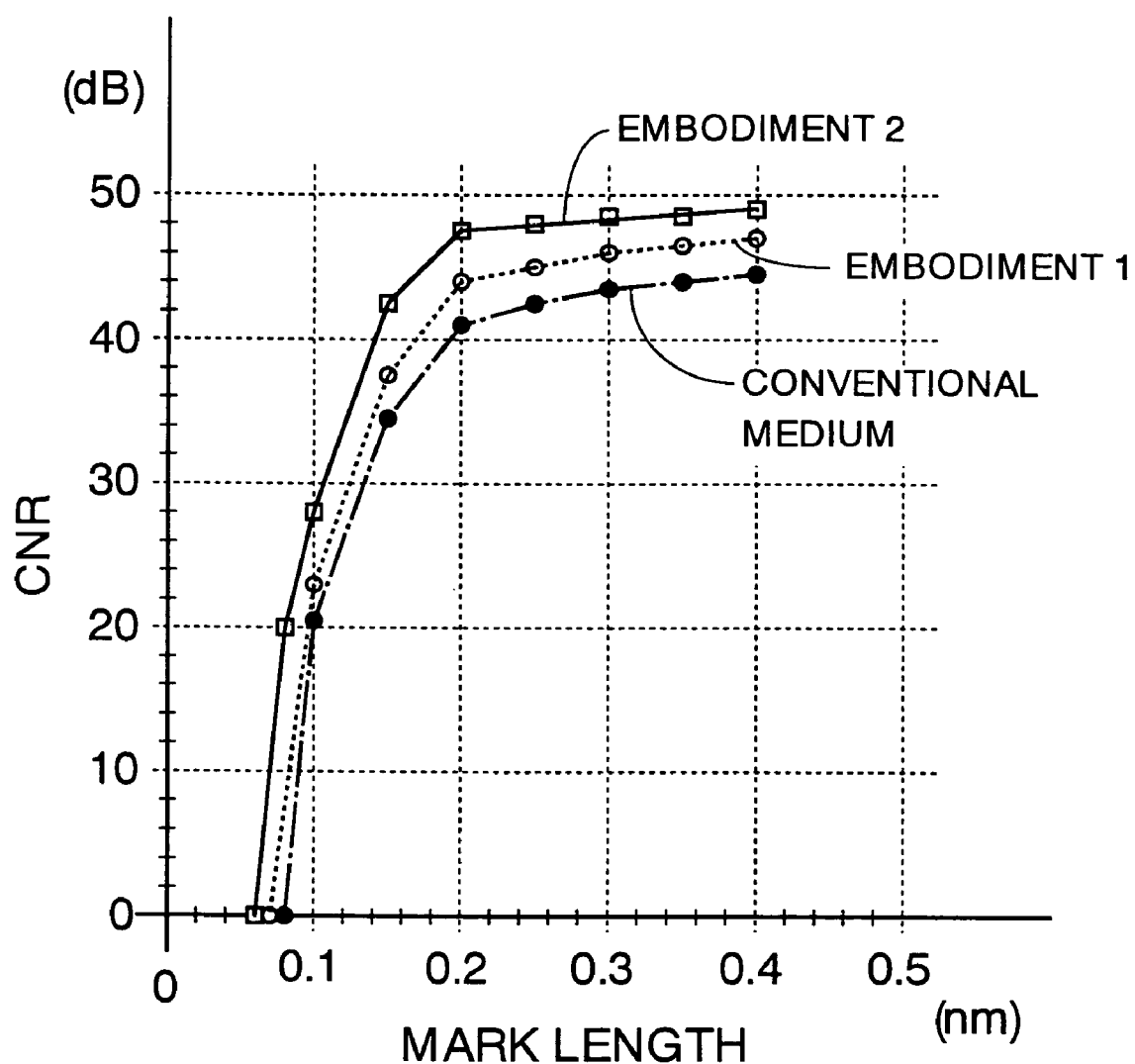
FIG. 8 is a graph showing a relationship between the mark length and the CNR (carrier to noise ratio) of various media.

FIG. 8 is a graph showing comparisons in CNR relative to mark length between the medium according to the first embodiment of the invention and the conventional medium. According to the graph, when the medium of the invention and the conventional medium have the same mark length, the medium of the invention has a higher and more favorable CNR than the conventional medium. Further, when mark lengths of the two media having the same CNR are compared, it is found that the medium of the invention has a smaller mark length, indicating that a smaller recording unit can be recorded.

From these results, it is understood that the medium according to the first embodiment of the invention allows for more reliable reproduction with a lower noise than the conventional medium having the same resolving power. Further, even when a light beam having a short wavelength (350–450 nm) is used, the medium of the invention allows for reproduction with a high CNR. Where the same CNR is to be achieved, the medium of the invention can have a higher density than the conventional medium.

Figure 9:
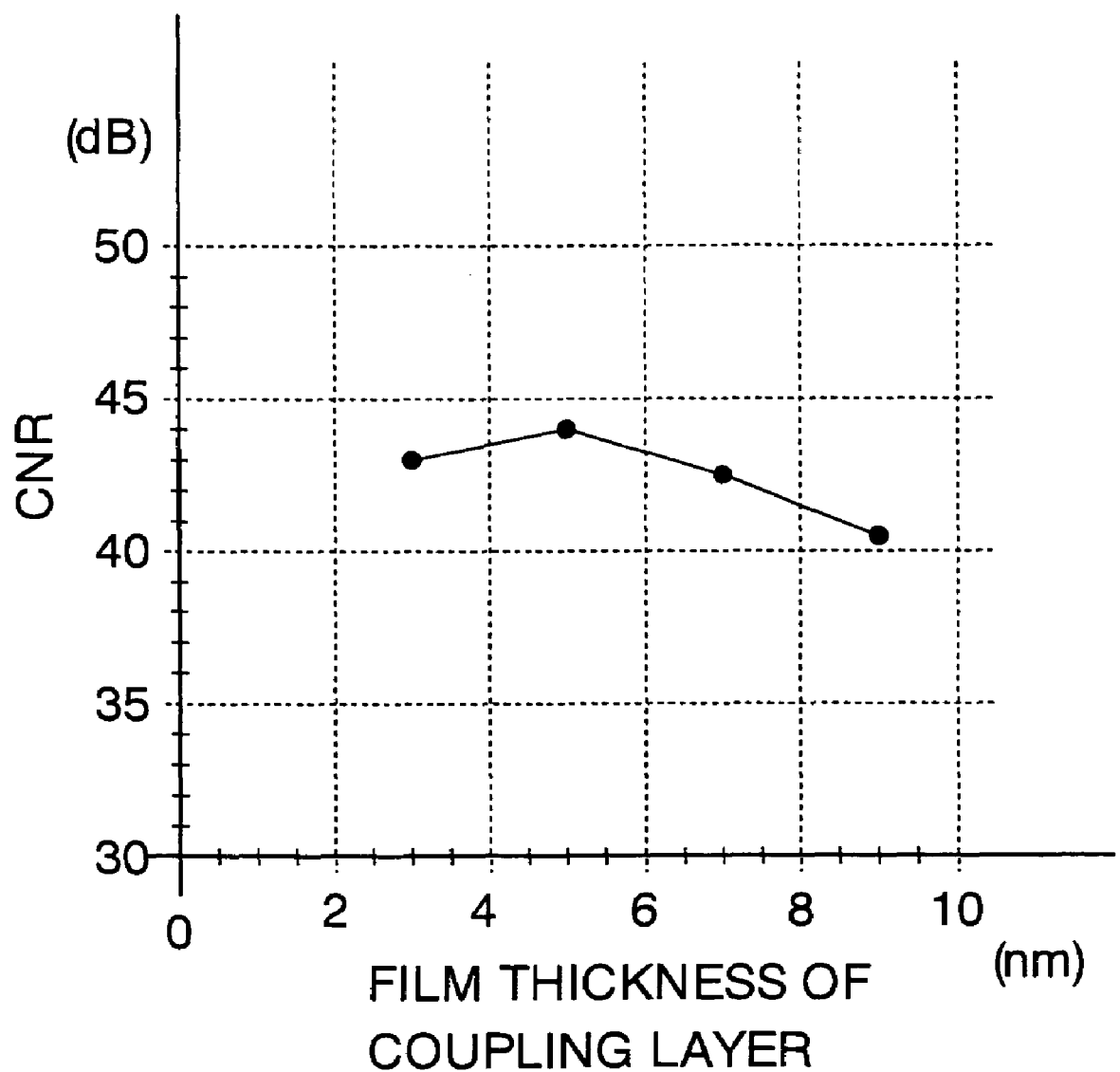
FIG. 9 is a graph showing a relationship between the film thickness of a coupling layer and the CNR of the medium according to the first embodiment of the invention.

In FIG. 9, a graph showing a relationship between the film thickness of the coupling layer 14 and the CNR of the medium according to the first embodiment of the invention. The coupling layer 14 is formed of MnFe having a Néel temperature of 200° C. According to the graph, the maximum CNR of 44 dB is obtained when the film thickness of the coupling layer 14 is about 5 nm. This indicates that there is an optimum value for the film thickness of the coupling layer 14.

When the film thickness of the coupling layer is too thick, the strength of the third exchange coupling exerted between the two reproducing layers (13 and 15) is too weak, and when the film thickness is too thin, the strength of the third exchange coupling is too strong. In both cases, the transfer of bits is not sufficiently conducted. Therefore, an optimum film thickness needs to be selected in consideration of a material of the coupling layer, the Néel temperature, and the third exchange coupling.

[Embodiment 2]

Figure 4:
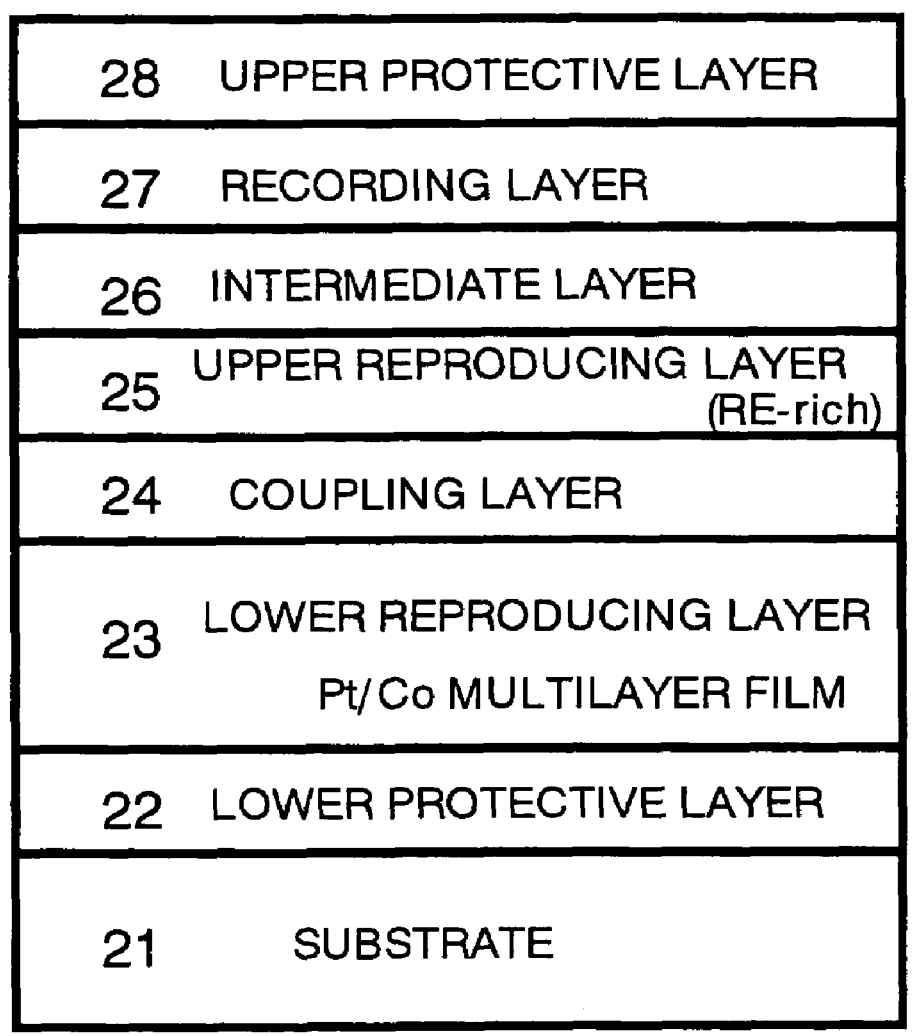
FIG. 4 is a sectional view illustrating the construction of a magneto-optical recording medium according to a second embodiment of the invention.
Figure 4:

FIG. 4 shows a sectional view illustrating the construction of a magneto-optical recording medium according to a second embodiment of the invention.

The medium according to the second embodiment of the invention has the same layer construction as the first embodiment except that the structure of the lower reproducing layer 13 is different.

Figure 5:
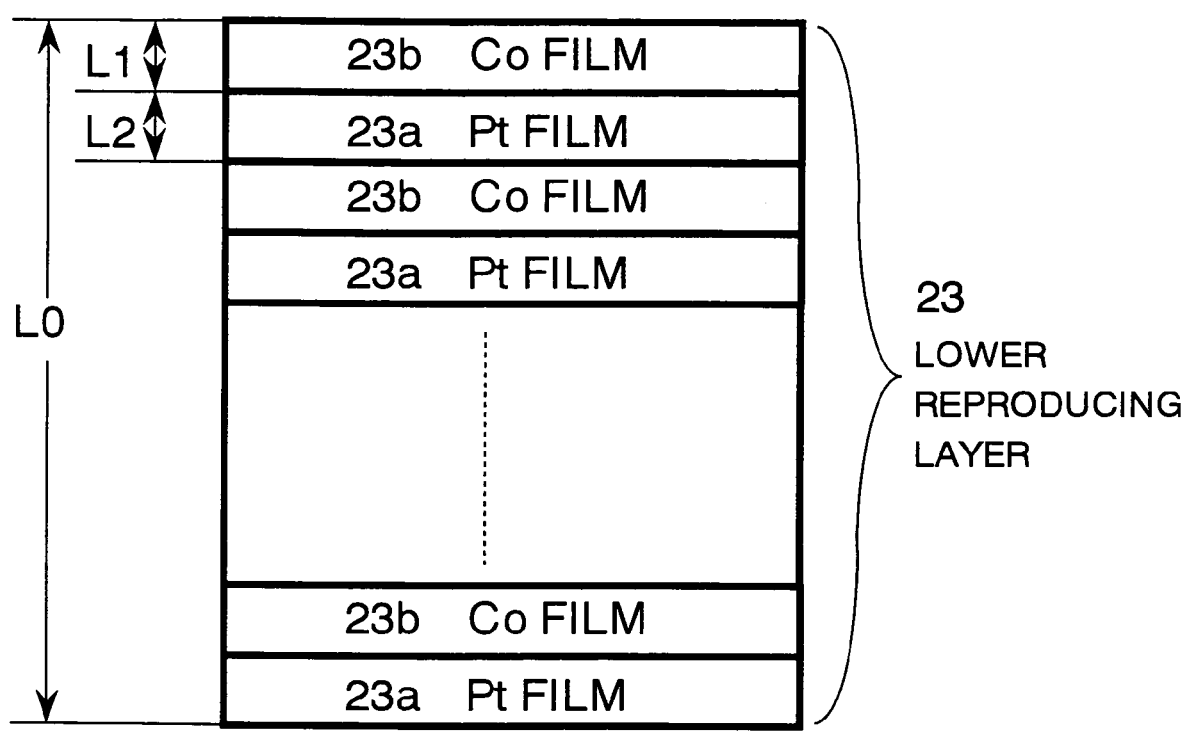
FIG. 5 is a sectional view illustrating the construction of a lower reproducing layer 23 according to the second embodiment of the invention.

In FIG. 5, a sectional view illustrating the construction of a lower reproducing layer according to the second embodiment of the invention is shown. The lower reproducing layer 23 has a multilayer structure of a Pt film 23*a* and a Co film 23*b* stacked alternately. The lower reproducing layer 23 has a Curie temperature of 280° C.

The lower reproducing layer 23 can be formed using the DC magnetron sputtering method as in the first embodiment. In this embodiment, a multilayer film is formed on a substrate having a lower protective layer 22 formed thereon using Pt and Co targets and argon gas at Ar gas pressure of 0.8 Pa and an electric power supply of 0.8 kW.

When the Pt films and Co films each having a thickness of about 0.25 nm are stacked to have an eight-layer structure, the lower reproducing layer 23 as a whole has a film thickness of about 4 nm. The other layers may be formed using the same material, thickness and production method as the first embodiment.

[Explanation on Magnetic State of Medium at Reproduction According to Embodiment 2]

Figure 12:
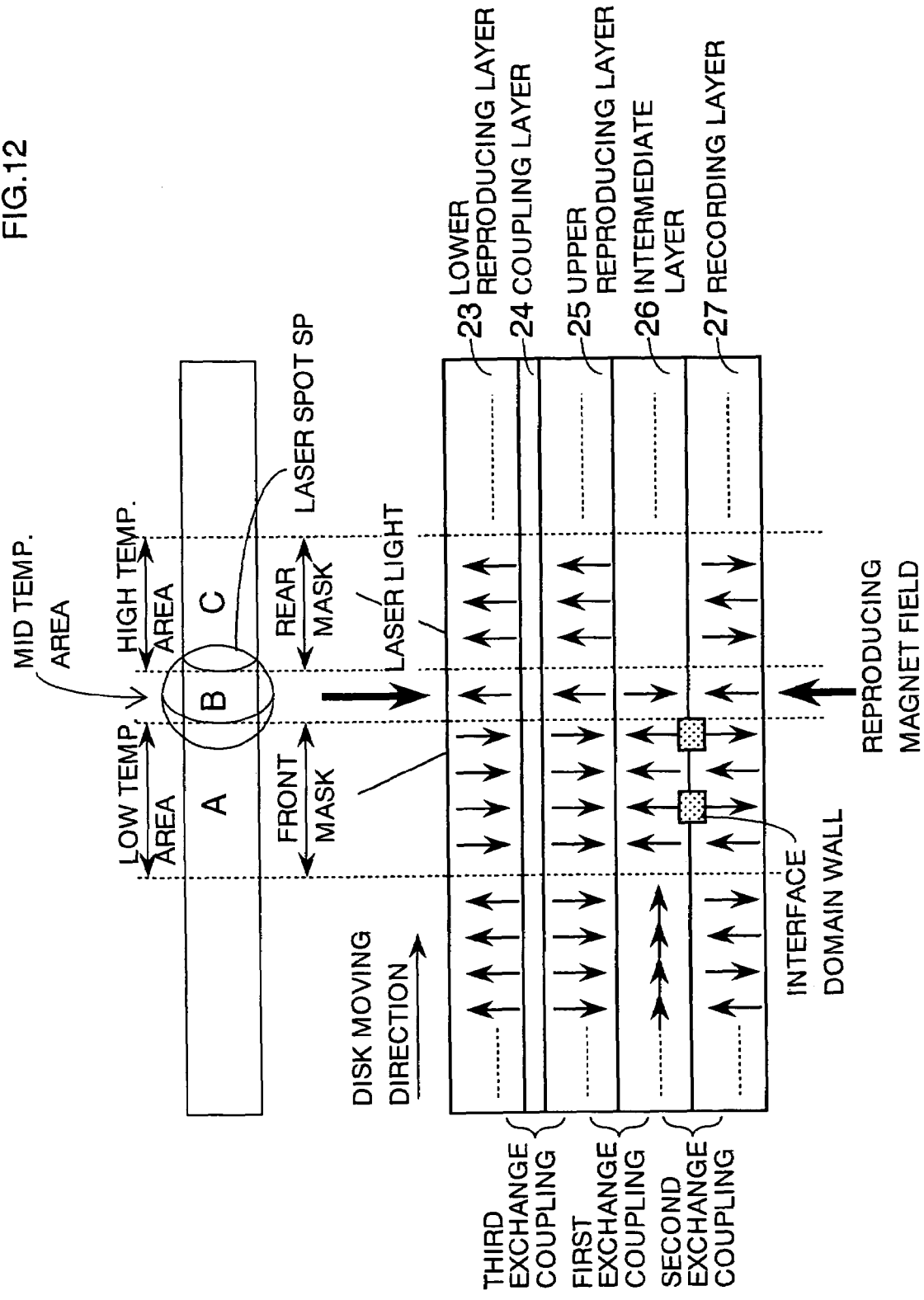
FIG. 12 is an explanatory view of the magnetic state of the medium at reproduction according to the second embodiment of the invention.

In FIG. 12, an explanatory view of the magnetic state of the medium at reproduction according to the second embodiment of the invention is shown.

In the figure, only a part from the lower reproducing layer 23 to a recording layer 27 of the medium is shown as in the first embodiment. As in the first embodiment, a laser light spot SP is divided into three areas of a low-temperature area A, a mid-temperature area B, and a high-temperature area C. Front and rear masks are formed in the low-temperature area A and the high-temperature area C, respectively.

In this embodiment, however, the direction of magnetizations of the lower reproducing layer 23 is different from the first embodiment. Since the Pt/Co multilayer film used as the lower reproducing layer 23 has greater magnetizations (saturation magnetization) than the GdFeCo film of the first embodiment, magnetizations of the upper reproducing layer 25 and the lower reproducing layer 23 are directed to the same direction.

In the low-temperature area shown in FIG. 12, the strength of first exchange coupling exerted between the upper reproducing layer 25 and the intermediate layer 26 is greater than the strength of second exchange coupling exerted between the recording layer 27 and the intermediate layer 26. Therefore, magnetizations of the upper reproducing layer 25 are directed to the direction opposite to the magnetizations of the intermediate layer (downward direction), whereby bits in the recording layer 27 are-masked. Further, in the low-temperature area A, the magnetizations of the lower reproducing layer 23 are directed to the same direction as the magnetizations of the upper reproducing layer 25 (downward direction) by third exchange coupling of the coupling layer 24.

On the other hand, in the mid-temperature area B, the first, second and third exchange coupling are effectively exerted between the respective layers, and the magnetizations corresponding to the bits recorded in the recording layer 27 are transferred to the lower reproducing layer 23.

In the high-temperature area C, since the first and second exchange couplings exerted on the intermediate layer are not functioning, the transfer of the magnetizations is not performed. Therefore, magnetizations in the same direction as the reproducing magnet field are generated in the upper reproducing layer 25. In other words, the magnetizations for masking the bits in the recording layer 27 are formed in the upper reproducing layer 25 and the lower reproducing layer 23.

The front and rear masks are also formed in the medium of the second embodiment, and the bits recorded in the recording layer 27 are transferred to the lower reproducing layer 23 through the layers in the mid-temperature area B. By detecting a Kerr rotation angle from the reflected light of the laser light applied on the lower reproducing layer 23, information is reproduced.

In FIG. 3, magnetic characteristic values of the medium according to the second embodiment are shown. Compared to the conventional medium, the reflectance R is increased to 0.4, the Kerr rotation angle θ k is increased to 0.9, and the performance index ($\sqrt{R} \times \theta$ K) is increased to 0.54 in the second embodiment. Further, the CNR is as high as 48 dB, showing an improvement over the conventional medium by 7 dB.

As shown in FIG. 8, the medium of the second embodiment has a higher CNR than the conventional medium when the two media have the same recording mark length. When the same CNR is to be achieved, the medium of the second embodiment can have a smaller recording mark length than the conventional medium.

Figure 10:
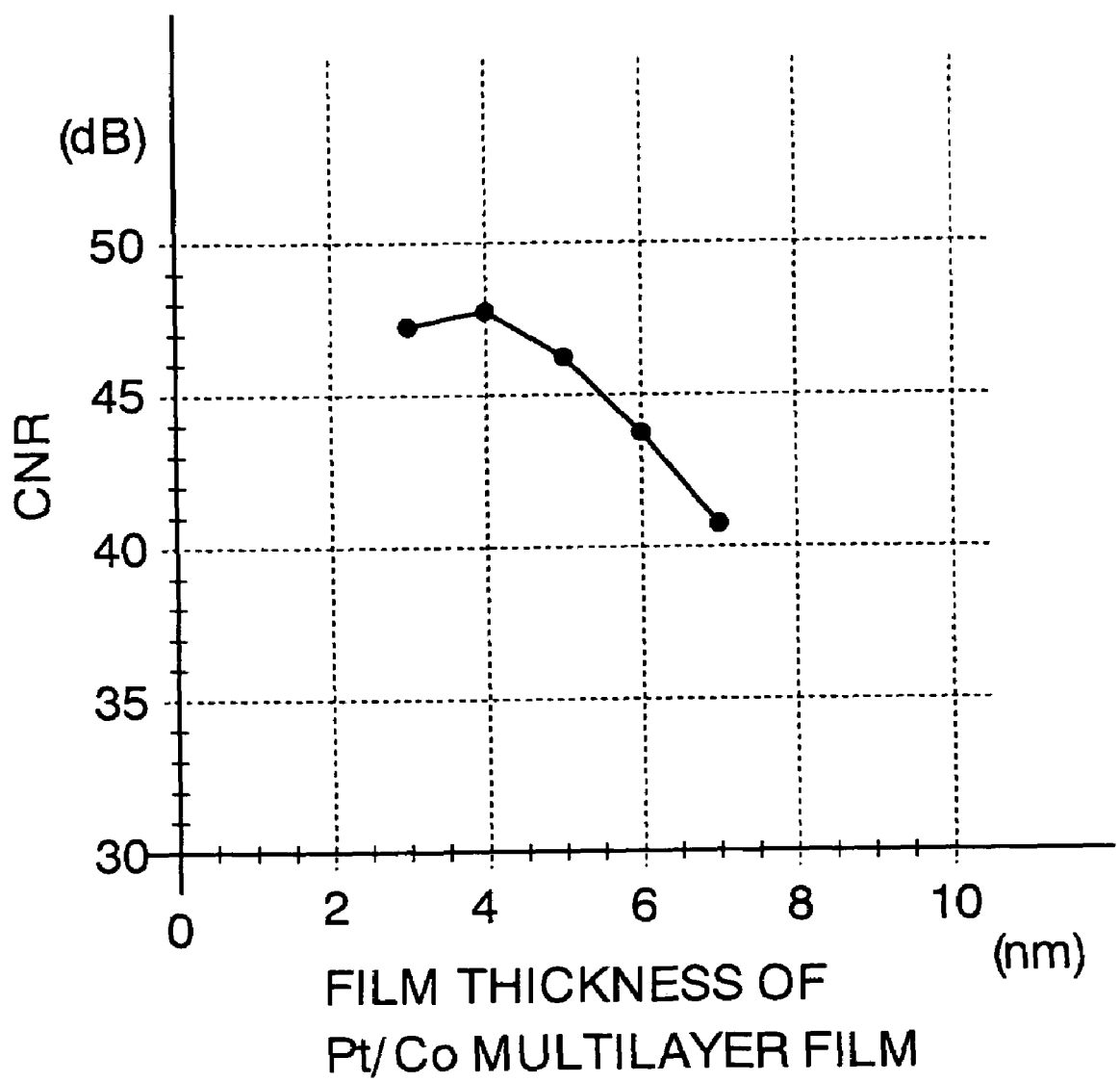
FIG. 10 is a graph showing a relationship between a Pt/Co multilayer film and the CNR of the medium according to the second embodiment of the invention.

FIG. 10 is a graph showing a relationship between the film thickness of the lower reproducing layer (Pt/Co multilayer film) and the CNR of the medium according to the second embodiment of the invention. It is apparent from the figure that the maximum CNR is obtained when the film thickness is about 4 nm, indicating that there is an optimum film thickness for the lower reproducing layer 23.

Since the Pt/Co multilayer film generally has large magnetizations, bits in the upper reproducing layer are not transferred when the film thickness of the whole film is too thick. When the film thickness is too thin, an unfavorable CNR is obtained because the Pt/Co multilayer film does not function and the Kerr rotation angle θ k does not increase. To moderately weaken the magnetizations of the Pt/Co multilayer film, it is preferable that each Pt and Co film is made thinner as well as the lower reproducing layer 23 as a whole.

According to FIG. 10, the overall thickness of the Pt/Co multilayer film needs to be 5 nm or smaller to achieve a CNR almost equal to or higher than that of the first embodiment.

As described above, the medium according to the second embodiment of the invention can achieve an improvement in CNR and a higher recording density when a laser beam having a short wavelength is used.

[Other Embodiments]

Figure 6:
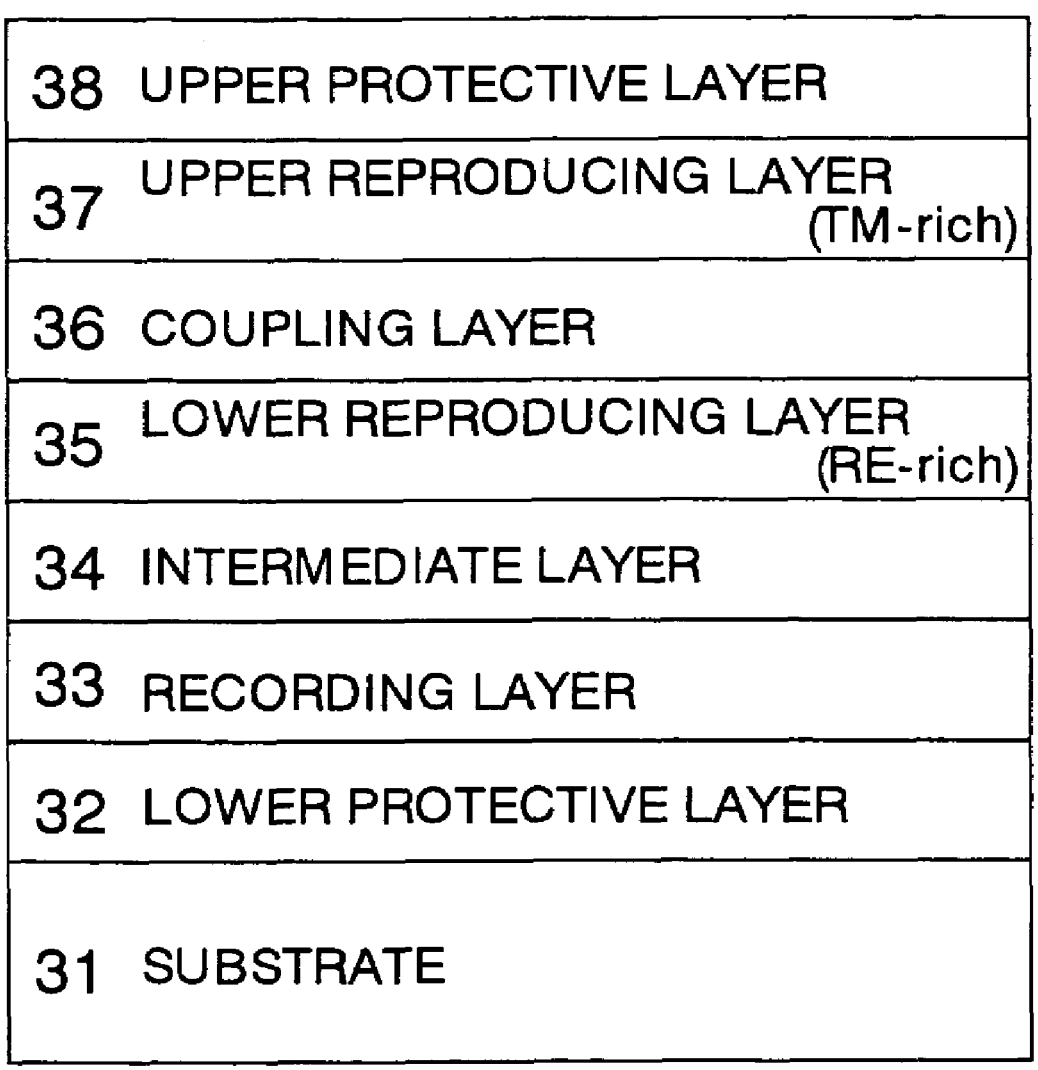
FIG. 6 is a sectional view illustrating the construction of a magneto-optical recording medium according to a third embodiment of the invention.

FIG. 6 shows a sectional view illustrating the construction of a magneto-optical recording medium according to a third embodiment of the invention.

The magneto-optical recording medium of the third embodiment has the same layer construction as the first embodiment except that the arrangement of the layers is changed. In this embodiment, a recording layer 33, an intermediate layer 34, a lower reproducing layer 35, a coupling layer 36, an upper reproducing layer 37, and an upper protective layer 38 are formed in this order on a lower protective layer 32. A light beam is emitted from the upper protective layer 38 side.

The medium of the third embodiment has improved magnetic characteristics and CNR as in the first embodiment, and can have a higher recording density when the laser beam having a short wavelength is used.

The layer construction of the invention is applicable to other MSR media such as a DRAD medium, and allows for the improvement in CNR and the higher recording density. Examples of other MSR media include a CAD (Center Aperture Detection) medium shown in FIG. 13, a DWDD (Domain Wall Displacement Detection) medium shown in FIG. 14, and a MAMMOS (Magnetic Amplifying Magneto-Optical System) medium shown in FIG. 15.

INDUSTRIAL APPLICABILITY

According to the present invention, the reproducing layer has the three-layer structure of the upper reproducing layer, the coupling layer and the lower reproducing layer so that the magnetic information in the lower reproducing layer is transferred by the coupling layer. This allows a fine CNR to be obtained even when the reproduction is performed using laser light having a short wavelength, and a higher recording density to be achieved.

The invention claimed is:

1. A magneto-optical recording medium comprising a recording layer, an intermediate layer and a reproducing layer stacked in this order, information recorded in the recording layer being transferred to the reproducing layer through the intermediate layer so that the information is reproduced, wherein the reproducing layer comprises an upper reproducing layer, a coupling layer and a lower reproducing layer formed in this order on the intermediate layer, and magnetic information in the upper reproducing layer in an area whose temperature is increased to a predetermined temperature is transferred to the lower reproducing layer through the coupling layer, wherein the lower reproducing layer, the upper reproducing layer and the coupling layer are formed of a transition metal magnetization dominant magnetic film, a rare-earth magnetization dominant magnetic film and an antiferromagnetic material, respectively, and the coupling layer has a Néel temperature higher than the temperature of the upper reproducing layer which is increased to the predetermined temperature at the transfer of information.

2. A magneto-optical recording medium according to claim 1, wherein the upper reproducing layer is formed of a rare-earth magnetization dominant GdFeCo film, and the coupling layer is formed of a material selected from the group consisting of MnFe, CuO, NiO, CoNiO, CrMn, and AuCr.

3. A magneto-optical recording medium according to claim 1, wherein the lower reproducing layer is formed of a transition metal magnetization dominant GdFeCo film or a multilayer film of a Pt film and a Co film stacked alternately.

4. A recording/reproducing apparatus for recording and reproducing information on/from a magneto-optical recording medium according to any one of claims 1 and 2–3, comprising:

a light source for emitting laser light of a short wavelength in the range of 350 nm to 450 nm;

a light collecting section for collecting the emitted light on a predetermined portion of the magneto-optical recording medium rotating at a predetermined speed;

a magnetic field applying section for applying a reproducing magnetic field to the predetermined portion of the magneto-optical recording medium; and a light detector for detecting a Kerr rotation angle for light reflected off the magneto-optical recording medium.

* * * * *